UNITED STATES PATENT OFFICE.

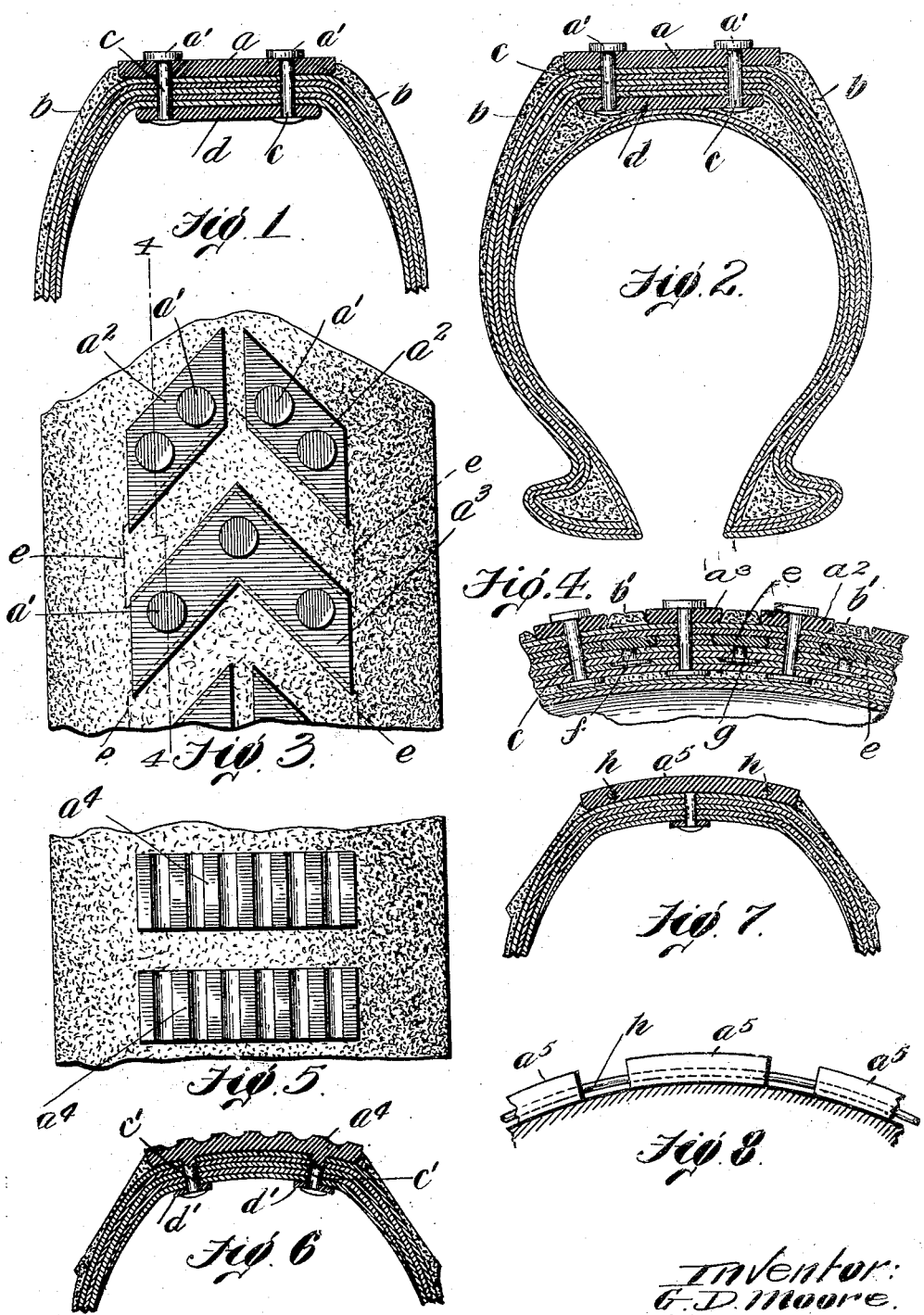

GEORGE D. MOORE, OF WORCESTER, MASSACHUSETTS.

PROTECTING DEVICE FOR TIRES.

No. 890,785.

Specification of Letters Patent.

Patented June 16, 1908.

Application filed January 3, 1907. Serial No. 350,586.

*To all whom it may concern:*

Be it known that I, GEORGE D. MOORE, a citizen of the United States, residing at Worcester, in the county of Worcester and State of Massachusetts, have invented a new and useful Protecting Device for Tires, of which the following is a specification.

This invention relates to that class of pneumatic tires in which the outer tube is provided with means on the wearing surface thereof or on that of the detachable shoe therefor for preventing or reducing skidding and puncture and reducing wear.

Various devices have been provided for similar purposes, and the principal objects of this invention are to provide simple and efficient means for accomplishing these results, and to afford additional protection to the tire the same being carried out by the use of a series of plates having wearing surfaces preferably provided with projections, and the attachment of these plates to the tire in such a manner as to prevent their accidental detachment therefrom.

The invention also comprises a novel method of producing the tire.

Further objects and advantages of the invention will appear hereinafter.

Reference is to be had to the accompanying drawing which illustrates certain forms in which the invention may be embodied, and in which Figure 1 is a transverse sectional view of a portion of one form of the outer tire or shoe showing the anti-skidding plates in position. Fig. 2 is a similar view of the complete outer tube. Fig. 3 is a plan of a portion of a tire showing another form of the invention. Fig. 4 is a longitudinal section of the same on the line 4—4 of Fig. 3. Fig. 5 is a plan of a modification. Fig. 6 is a transverse sectional view of the form shown in Fig. 5. Fig. 7 is a similar view showing a modification comprising a fastening device which can be employed, and Fig. 8 is a longitudinal section of the same.

In carrying out this invention the wearing surface of the tire is provided with a plurality of plates $a$, $a^2$ or $a^3$ which may extend transversely or obliquely, as shown in Fig. 4, and which may be either smooth or rough on their outer surface. In the form shown in Figs. 3 and 4 they are provided with projections $a'$, while in the form shown in Figs. 5 and 6 the plates $a^4$ are corrugated on their wearing surfaces.

In the form shown in Figs. 3 and 4 the wearing plates $a^2$ are shown disposed in oblique position, and in order to break joints two of the plates $a^2$ are shown located adjacent to each other, forming a V, and alternating with them are V-shaped plates $a^3$. These plates may be modified as shown in Fig. 6, or in any other desired way to accomplish the same result. They may be placed upon the outside of the tire or removable shoe, but I prefer to embed them slightly in the rubber itself, that is, to place them in such position that the rubber $b$ will extend outwardly between the plates to form cushioning projections $b'$ (Fig. 4) which may constitute practically continuous surfaces with respect to the plates. The plates are separated from each other for the purpose of affording resiliency, and the cushioning projections $b'$ are preferably extended between the plates in order to assist in holding them in position without destroying the resiliency of the tire or protecting shoe.

In the manufacture of the tire or shoe, a few layers of frictioned duck or the like are first secured together in any desired way to form one piece, then the plates are placed thereon in desired position and fastened through this piece. The fastening means may be varied but in the form shown in Fig. 1, the plates are provided with perforations, and rivets $c$ are passed through the same, the heads of the rivets projecting from the outer faces of the plates. The ends of the rivets project inside and are held in place by washers $d$ over which their ends are riveted.

In the form shown in Fig. 6 the rivets are in the form of integral inwardly extending projections $c'$ on the plates which can be riveted over a single washer $d$ or a separate washer $d'$ for each projection or rivet as desired. After this much of the article is constructed, as shown in Fig. 1, the same is placed in a mold, and the remainder of the tire or shoe applied and vulcanized thereto to produce an article such as indicated in Fig. 2 or Fig. 4. In an article completed in this manner it will be seen that while the metal plates are resiliently supported, not being connected together, but being separated by resilient material, a yielding action is permitted yet they are securely fixed to the tire or shoe in such a manner that it is practically impossible for them to be detached. As the washers to which they are anchored are firmly fixed within the body of the tire or shoe, the rubber and frictioned duck surrounding the same and being vulcanized together around them, it will be seen that although they may yield as much as would be desired in practice, yet they cannot be dislodged without entirely destroying the tire. Moreover, as each plate is preferably fixed at at least two points to a washer, it will be seen that although the yielding action is not materially reduced, yet any motion of a plate is resisted by the washer $d$, and one end of the plate, although it can yield to a certain extent, cannot be torn from the tire because it is connected therewith at the other end of the washer $d$. In the preferred forms each plate is held, as stated, by its rivets or projections being riveted to a single washer or plate.

As so far described, the only means for preventing puncturing at points between the plates is the additional thickness of rubber $b'$ before described and the ordinary protection afforded by the shoe or the tire itself, in addition to which should be considered the protection afforded from the fact that the plates are located sufficiently near each other to prevent large pieces of glass or the like from passing far into the tire. In order thoroughly to protect the inner part of the tire or shoe, I prefer to provide additional plates $e$. These plates may be smaller than the plates $a$, $a^2$, $a^3$, $a^4$ or $a^5$ if desired but should be sufficiently large to overlap the edges thereof so as to afford protection for the whole of the tire. It will be seen that by the placing of such plates within the body of the tire or shoe and at some little distance inward from or behind the plates $a$, $a^2$, $a^3$, $a^4$ or $a^5$ all the protection afforded by a continuous metal outer rim will be provided for and yet there will be no substantial reduction in the resiliency of the tire.

The preferred way of manufacturing the tire or shoe with these plates in position, as indicated in Fig. 4, is first to form two or more thicknesses of frictioned duck and unite the plates $e$ to them in a manner similar to that described above, rivets or projections $f$ being employed and these being provided with washers $g$ on the inner face of the frictioned duck. When these are in position, the outer portion of frictioned duck and rubber is applied and some inner thicknesses of frictioned duck are placed over the headed ends of the rivets or projections $f$. Then the plates $a$, $a^2$, $a^3$, $a^4$ or $a^5$ are applied and the article completed in the manner described above.

As an additional means of securing the plates in position, I have shown in Figs. 7 and 8 a construction in which the plates $a^5$ are provided with perforations, these perforations being in line with each other along the circumference of the tire, then fastening devices, preferably in the form of two or more wires $h$, are threaded through the perforations and their ends secured together so as securely to hold the plates in position. The wires may be located on the outside of the rubber or embedded therein. When this form of fastening device is used, the projections or rivets may be dispensed with but I prefer to retain them as is indicated in Fig. 7.

While I have illustrated and described certain ways in which the plates can be constructed and held in position I am aware that many modifications may be made therein without departing from the scope of the invention as expressed in the claims.

Having thus described my invention, what I claim is:—

1. In an article of the class described, the combination of a series of plates arranged around the periphery thereof on the surface of a body of yielding material, said plates being spaced apart and the yielding material extending in the spaces between them so as to form a substantially continuous surface with them, said plates being arranged obliquely and in such manner as to break joints, a plurality of rivets extending inwardly from each plate, and washers embedded within the body of yielding material and surrounded by said material, said rivets passing through the plates and having their heads on the outside of the same and constituting anti-skidding projections.

2. An article of the class described formed of resilient material and having on the wearing surface thereof a plurality of individually supported plates separated from each other, the resilient material extending into the spaces between the plates and forming cushions between them, and metallic protecting plates located behind said cushions.

3. An article of the class described formed mainly of resilient material and having on the surface thereof a plurality of individually supported plates separated from each other, and a plurality of plates entirely separated from the first named plates by the resilient material and located within the body of the resilient material and directly inward from or behind the spaces between the first named plates.

4. An article of the class described, having on its surface a series of metallic plates spaced apart, means embedded in the body of the article for holding said plates in position, plates located intermediately between the first named plates and their holding means and within the spaces between the first named plates for protecting the inner portion of the article from puncture, and a body of resilient material located between the outside series of metallic plates and said intermediate plates.

5. An article of the class described having protecting plates on its surface spaced from each other, washers within the body of the article for holding said plates, a series of plates located within the body of the article and back of the spaces between the first named plates, and means also located within the body between the washers and the first named plates for holding the second plates in position.

6. A method of making articles of the class described, which consists in forming layers of fabric, then placing a series of metallic plates on the outside of the same, and fastening means on the inside and securing the metallic plates to the fastening means, then placing fabric on both sides of the structure thus produced, placing a series of plates alternately with the first named plates on the outer surface thereof, placing washers on the inner surface thereof and securing the outer plates to the inner washers, placing the article thus produced in a mold and molding resilient material over the washers.

In testimony whereof I have hereunto set my hand, in the presence of two subscribing witnesses.

GEORGE D. MOORE.

Witnesses:
  ALBERT E. FAY,
  LOUIS W. SOUTHGATE.